Figure 1:
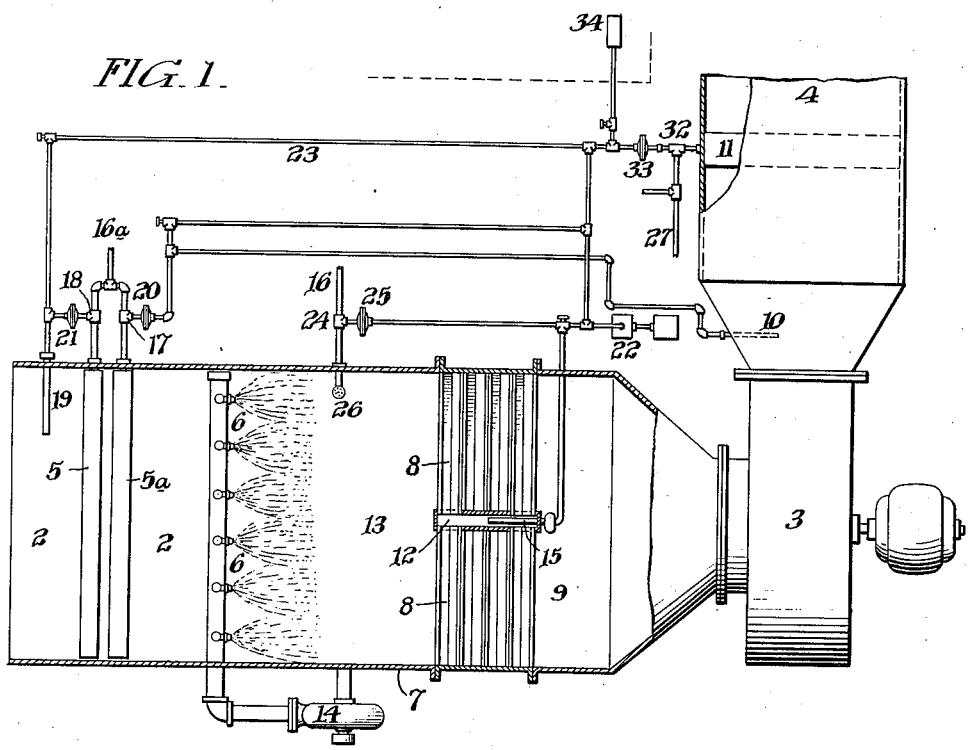

W. G. R. BRAEMER & S. C. BLOOM.
METHOD OF HUMIDIFYING AIR.
APPLICATION FILED DEC. 19, 1914.

1,142,483.

Patented June 8, 1915.

WITNESSES
Daniel Webster Jr.
E. W. Smith

INVENTORS
Wm. G. R. Braemer &
Saml. C. Bloom
BY
ATTORNEY

UNITED STATES PATENT OFFICE.

WILLIAM G. R. BRAEMER AND SAMUEL C. BLOOM, OF CAMDEN, NEW JERSEY, ASSIGNORS TO WARREN WEBSTER & COMPANY, A CORPORATION OF NEW JERSEY.

METHOD OF HUMIDIFYING AIR.

1,142,483.             Specification of Letters Patent.             Patented June 8, 1915.

Original application filed May 14, 1914, Serial No. 838,415. Divided and this application filed December 19, 1914. Serial No. 878,160.

*To all whom it may concern:*

Be it known that we, WILLIAM G. R. BRAEMER and SAMUEL C. BLOOM, citizens of the United States, and residents of Camden, county of Camden, and State of New Jersey, have invented an Improvement in Methods of Humidifying Air, of which the following is a specification.

Our invention relates to a method for humidifying air, and the present application is a division of our application filed May 14, 1914, Serial No. 838,415, wherein the apparatus of our invention for humidifying air is disclosed.

The object of our invention is to provide a method by which to obtain a reasonably exact humidified condition of the air to be delivered for use, and so that the average condition of the humidified air thus produced may be maintained very closely, approximately to the predetermined theoretical condition required, the maintenance of this humidified condition of the air being automatically controlled.

In carrying out the method the fresh air may, if too cold, be first subjected to the heat from tempering coils, and then to an aqueous vapor of desired temperature to impart to the air the requisite quantity of moisture to provide an absolute humidity at the temperature there prevailing, which will, when the humidified air is retempered or reheated, impart a temperature which, in the subsequent use of the humidified air, will furnish the condition of relative humidity which is required in the room or place to which the air is conveyed; and this absolute humidity is maintained accurately, preferably by maintaining the temperature of the water from which the vapor is produced substantially constant by means of a thermostat subjected to the temperature of the water from the eliminators which is precipitated from the humidified air as it passes through the eliminators. Heretofore, the regulation of the temperature conditions has been done by humidistats or thermostats arranged at some one place in the general flow of humidified air, but owing to the fact that different strata or portions of the air passing through the large passageway or casing of the apparatus is frequently very different, the regulations of humidity conditions based upon this condition at one place would not be consistent with the requirement at another place in said body of air and the accuracy of the regulation is therefore materially affected. By the present method, all of the precipitated water from the air is automatically mixed and returned to the water tank, and this average mixture, thus taken, being a fair average of the entire precipitated moisture of the body of humidified air at any moment, is caused during its return flow to the tank to act upon a thermostat, which in turn controls the conditions within the apparatus for causing the fresh air to take up more or less moisture as the conditions may require to insure the proper humidification of the air to be delivered in a tempered condition to the blower and maintain it as constant as possible. The precipitated moisture from various portions of the eliminators, and hence from different portions of the flowing body of humidified air, is caused to flow to a common passage and provide a constantly moving water body which represents the average temperature conditions of the humidified air leaving the eliminators, and this moving body of water is caused to act upon a thermostat which controls the admission of steam or other heating medium to the spray or vapor water to impart to it a temperature suitable for the purposes of humidification of the air under our invention. The said thermostat may control the humidity condition of the air in any other convenient manner, if so desired. In this manner the innumerable samples of precipitated water are continuously taken at every moment of the operation of the apparatus, and are being mixed together and the temperature thereof made to constantly act upon the thermostat, so that a most accurate regulation of the moisture and temperature conditions of the air are accomplished.

Figure 2:
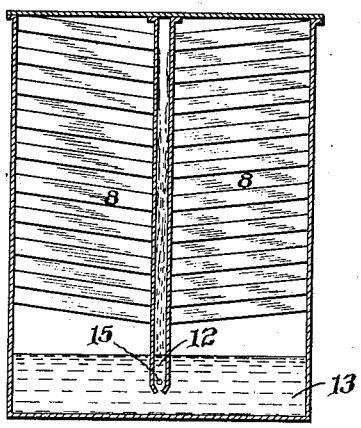
Figure 3:
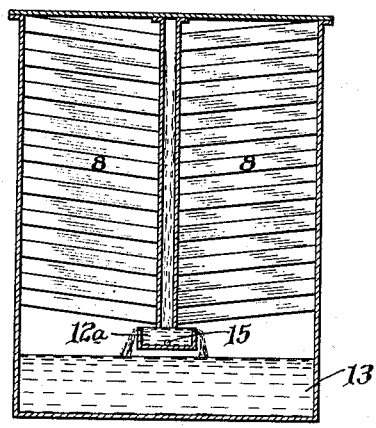

Our invention will be better understood by reference to the drawings, in which:

Figure 1 is a plan view of a humidifying apparatus for carrying out the method of our invention; Fig. 2 is a transverse sectional elevation of the same through the eliminators; and Fig. 3 is a sectional elevation, corresponding to Fig. 2, of a modified form of apparatus for carrying out our invention.

2 is the tubular casing or body of the apparatus and provides a longitudinal passageway which receives, at one end, fresh air, and delivers the humidified air at the other end by means of a blower 3, which is operated by a suitable motor, said blower delivering the air to the conduit 4, which leads to the room or place of use. The tubular passage 2 contains in its length, apparatus for tempering or heating, supplying moisture, removing excess moisture and reheating. The fresh air on entering, is brought in contact with the tempering coils 5, the temperature of which may be automatically regulated by controlling its steam supply from pipe 16ª by a motor valve 18, in turn controlled by a thermostat 19 as hereinafter described. The heated or tempered air is then passed into the humidifying compartment 7 into which water vapor from nozzle 6 is projected to impart to the heated air the moisture which is required to be absorbed. This vapor is formed from water which is heated, by means of steam, to a greater or less extent to suit the conditions prevailing in the temperature of the water flowing from the eliminators 8 into the tank 13 at the bottom of compartment 7. The surplus moisture carried by the air is removed by the eliminator structure 8, and the air which passes into the compartment 9 should then be in the condition in which it will have the necessary absolute quantity of moisture to meet the requirements of the air conditions to be delivered to the room; but the absolute humidity which is contained by the air at this point is utilized to provide the lower relative humidity which the air must have after it has been raised in temperature to the condition required when it is delivered to the room and this increase of temperature and lowering of the relative humidity may be performed by the reheating coils 11. While the use of reheating coils 11 and temperature control thereof will enable the humidified air to be raised in temperature and its relative humidity lowered to the degrees required, nevertheless, in place of the coils 11 being varied in temperature, any of the usual regulated by-passes around the reheating coils may be employed, as is well known to those skilled in this art, said reheating or special means therefor not forming any essential part of our invention.

The temperature of the reheating coils 11 may be automatically controlled by the motor 33 which controls the supply of steam by valve 32 to the coils, the said motor itself being under the control of the thermostat 34 located where it is affected by the air in the room or compartment.

The supply of steam to the spray water, to give it the proper temperature before being sprayed or vaporized by the nozzles 6, is regulated by a valve 24 operated by a motor 25, said motor being controlled by the thermostat 15 extending into or arranged in the compartment or passage 12 through which the water from the eliminators 8 passes. The valve 24 is arranged in the steam pipe 16 and controls the discharge of the steam through the rose nozzle 26 in the tank 13 which receives the surplus spray water including the water from the compartment 12 leading from the eliminators. A pump 14 is employed to circulate the water from the tank 13 to the nozzles whereby the same water is repeatedly used, the loss due to humidification of the air being made up by any ordinary float control supply valve (not shown). The temperature of this water is maintained by the addition of steam under the control of the thermostat 15, as above stated, so that if the eliminator water should indicate the slightest loss of temperature, a corresponding additional admission of steam from the nozzle 26 to the water in the tank 13 would be automatically provided to overcome the tendency to the drop in temperature.

If desired, a second tempering coil 5ª may be employed for preheating the incoming air. The steam to this coil from pipe 16ª may be regulated by valve 17 operated by a motor 20 which is controlled by a thermostat 10 in the conduit or passage 4 between the blower 3 and reheating coil 11. This second tempering coil 5ª may be employed to assist the coil 5 in providing a temperature to the incoming fresh air before it is subjected to the water vapor from the nozzles 6 which will insure a substantially constant temperature with a definite absolute humidity before being reheated, but either or both of these coils 5 and 5ª may be omitted if so desired, according to conditions of the fresh air to be treated. It is also to be understood that the tempering coils or means for preheating the fresh air may be made in any of the well known ways familiar to those skilled in the art, the motors 20 and 21, either or both, under the control of their thermostats, being adapted to regulate the temperature.

It is to be understood, that while it is most advantageous under some conditions to provide special means for accurately controlling the temperature of the air before it is subjected to the aqueous vapor from the nozzles 6, our invention is not so restricted, because if the atmospheric conditions are such that the air will, when treated with the temperature conditions of the spray water, have a temperature in the compartment 7 which will insure the requisite absolute humidity to provide the ultimate relative humidity required, such pretempering may be partly or wholly omitted. Furthermore, the humidified air leaving the eliminators 8 may be saturated or not, as may be desirable to suit the conditions to be met, a condition of saturation being in no sense an essential feature of our invention; and this latter will be understood by our pointing out that the temperature of the thermostat 15 will correspond to the wet bulb temperature of a hygrometer whether the air is saturated or not, because the thermostat is affected by the water from the eliminators and this has the temperature of the humidified air irrespective of its condition as to saturation; saturation may, under some conditions be present, but it would be an incident and not a dominating factor.

The various motors 20, 21, 25 and 33 are operated by compressed air supplied to them by pipes 23 and a compressor 22, and the action of said compressed air in operating the motors is regulated or controlled by the respective thermostats 10, 19, 15 and 34, which manner of operating motor actuated valves is well known in the art, and we do not restrict ourselves to such details.

In place of employing the particular construction of passage or compartment 12 shown in Fig. 2 for conducting the heated water from the eliminators over the thermostat 15, we may employ any other suitable arrangement, such for example as illustrated in Fig. 3. In this case, the eliminator water passes into a small vessel or compartment 12ª open at the top and in which the thermostat 15 is arranged, so as to be directly affected by the temperature of the eliminator water. The overflow from the vessel 12ª falls into the tank 13 and mixes with the water therein. It is immaterial to our invention as to the particular construction or arrangement of the eliminators or of the particular manner in which the heated water therefrom is supplied to the thermostat, as any convenient arrangement may be employed so long as the normal variations in the temperature of the eliminator water is made to act upon the thermostat 15.

The operation is as follows: The air being supplied at suitable temperature, is subjected to the humidifying action of the water vapor from the nozzles 6 and becomes humidified with moisture at the predetermined temperature. This humidified air then passes through the eliminators 8, where the mechanically suspended moisture is precipitated and conveyed to the chamber 12 on its way back to the tank 13. The humidified air then passes through the reheating coils 11 and, in its condition of higher temperature and lower relative humidity, is delivered to the place of use. The water from the eliminators 8 has the same temperature as wet bulb temperature of the humidified air, and as this water is taken from every portion of the air, it is a composite or average of the wet bulb temperature of all the air passing at substantially any period of time. Any variation in the temperature of this eliminator water affects the thermostat 15 and insures control of the admission of steam to the tank water by the nozzle 26 to at all times control its temperature to suit the humidification required. This humidification under the control of the wet bulb temperature of the air may be supplemented, if desired, with thermostatic control by the dry bulb temperature of the humidified air also, the latter controlling the tempering of the air before subjection thereof to the aqueous vapor.

We have shown the apparatus in the form we have preferred for the practical carrying out of the method herein described, but we do not restrict ourselves to the details of the said apparatus, as these may be modified without departing from the spirit of the invention.

Having now described our invention, what we claim as new and desire to secure by Letters Patent, is:—

1. The herein described method of humidifying air which consists in heating the fresh air and supplying it with aqueous vapor whereby the air becomes humidified, mechanically removing the suspended water from the humidified air, collecting the separated water from different portions of the humidified air, energizing a thermostat by the collected water thus separated before it becomes materially changed in temperature, and regulating under the control of the thermostat the temperature of the aqueous vapor supplied to the air.

2. The herein described method of humidifying air, which consists in supplying the air with aqueous vapor whereby the air becomes humidified, mechanically removing the suspended water from the humidified air, collecting the separated water from different portions of the humidified air, energizing a thermostat by the collected water thus separated and before it becomes materially changed in temperature, regulating under the control of the thermostat the temperature of the aqueous vapor supplied to the air, controlling the temperature of the inflowing fresh air to be humidified by the temperature of the humidified air, and finally reheating the humidified air to lower its relative humidity.

3. The herein described method of humidifying air, which consists in passing the air through a conduit and over a body of water, heating said water by steam, circulating the said water in the form of aqueous vapor to humidify the air, removing the suspended water from the humidified air and collecting said water on its way to the body of water, causing the said collected water on its way to the body of water to energize a thermostat, and controlling the supply of steam to the body of water under the control of the thermostat, whereby the temperature of the aqueous vapor is regulated under the control of the temperature of the separated water immediately after it is separated from the humidified air.

4. The herein described method of humidifying air, which consists in raising the temperature of the fresh air and treating it with an aqueous vapor to humidify it, separating the suspended water from the humidified air and collecting said separated water, energizing a thermostat by the collected separated water immediately after its separation and before it has had time to materially change its temperature, and regulating the temperature of the aqueous vapor supplied to the air under the control of the thermostat.

In testimony of which invention, we hereunto set our hands.

WILLIAM G. R. BRAEMER.
SAMUEL C. BLOOM.

Witnesses:
 HERBERT A. TERRELL,
 JOHN F. HALE.